Dec. 2, 1952   E. F. LILLIE   2,620,118
BREADBOX
Filed June 22, 1949

*INVENTOR.*
EUGENE F. LILLIE
BY
ATTORNEY

Patented Dec. 2, 1952

2,620,118

UNITED STATES PATENT OFFICE 2,620,118

BREADBOX

Eugene F. Lillie, Minnetonka Beach, Minn., assignor to A B C Corrugated Box Company, Minneapolis, Minn., a corporation of Minnesota Application June 22, 1949, Serial No. 100,708

2 Claims. (Cl. 229—42)

This invention relates to boxes made of corrugated fiber board and designed to carry loaves of bread from the bakery to the distributer. In the jargon of the trade, the invention relates to "hot bread boxes," i. e., boxes to contain warm bread fresh from the bakery ovens.

Because of the highly competitive conditions in the bakery industry, and the fact that a freshening agent is used in the manufacture of nearly all bread today, it must arrive at the retail stores bakery-fresh. Of nearly equal importance is shrinkage; obviously a larger loaf will outsell a smaller load offered at the same price. However, with present methods of packing, the loaves are stood on end in the boxes, with the result that when they arrive at the retailers, they have shrunk (lengthwise) one to two inches.

In accordance with the invention, a box is provided of such construction that hot bread can be packed in it and then transported to the retailer without noticeable shrinkage, usually being still warm when unpacked from the box. Other advantages of the invention will be pointed out in the following description of the preferred embodiment of the invention shown in the accompanying drawings forming a part of this specification.

In said drawings.

Referring particularly to the drawings, the "bread pad" which forms part of the invention is preferably made from a single sheet of corrugated board, preferably 200 lb. test, cut to form a blank 5 which may be 51½ inches long and 23½ inches wide, said sheet being scored, bent and then stapled, as will be described, and then placed in an ordinary fiber board box 6, which may be 275 lb. test, RSC stitched, 25½ in. x 19¾ in. x 10¾ in.

Figure 1:
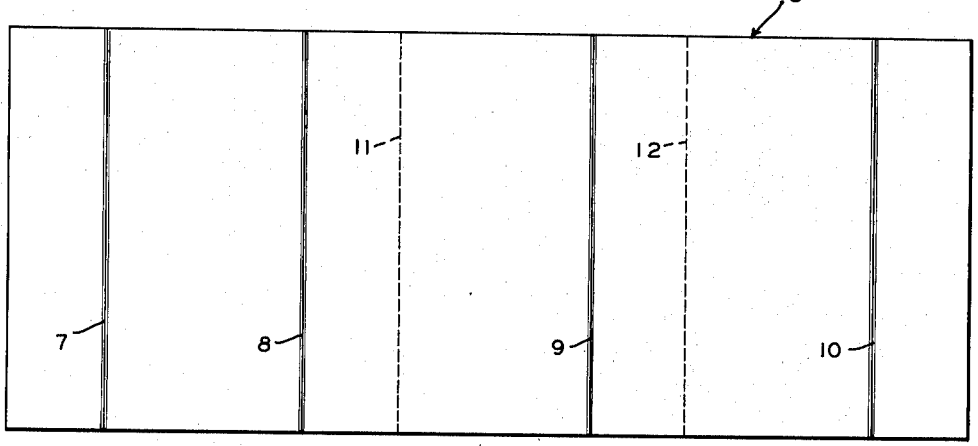
Fig. 1 is a plan view of the corrugated fiber board blank forming the "bread pad"
Figure 2:
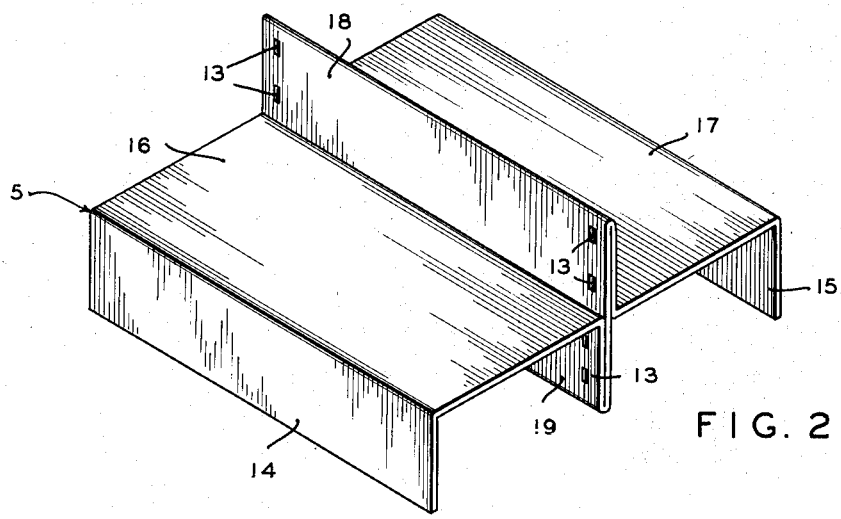
Fig. 2 is a perspective view showing the "bread pad" set up and ready to be inserted in the box.

The blank 5 is scored laterally on one side as indicated at 7, 8, 9 and 10, and on the other side as indicated at 11 and 12, then is folded and set up as shown in Fig. 2, with staples 13 to hold the double parts close together. The complete "bread pad" of Fig. 2 consists of two vertical legs 14, 15 (which are downturned end flaps of blank 5), two horizontal bread-supporting sections or trays 16, 17, a vertical divider 18 of double thickness separating the trays 16, 17, and a central leg 19 also of double thickness and located directly beneath the divider 18. The end legs 14, 15 are supported against turning by contact or near contact with the inside walls of box 6, but the middle leg 19 stands alone and hence must be of extra stiffness and strength.

Figure 3:
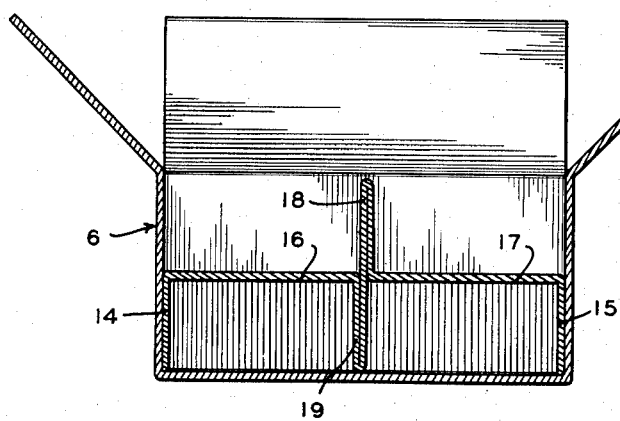
Fig. 3 is a cross section through the box with the "bread pad" in position.

The set up "bread pad" has three parallel vertical legs supporting a horizontal tray divided into two parts, each of which supports four loaves of bread horizontally. As there are two trays 16, 17, and as the trays are spaced above the bottom of the box sufficiently to accommodate loaves beneath the trays, the box of Fig. 3 will hold sixteen loaves, four in each cell, each loaf being horizontal or in the normal position of loaves of bread. In this position the loaves will not shrink. The divider of course prevents longitudinal shifting of the loaves in one direction when the bread box is lifted or pushed around, while the loaves themselves, being in contact with each other or with the sides of box 6, are prevented from lateral shifting or longitudinal shifting in the opposite direction.

In actual usage of the described hot bread box, it has been found that one person can pack five of the boxes with sixteen loaves each (80 loaves) in the same time that two persons required to pack three old style boxes with twenty loaves each (60 loaves). And as stated above, shrinkage was eliminated.

Of perhaps equal importance is the fact that the described box permits the bakeries to pack bread while it is still quite warm. Thus time is saved, and space is saved too, as large areas need no longer be devoted to mere cooling of the bread.

Having described my invention, what I claim as new and desire to secure by Letters Patent is:

1. In combination with a box having the shape of a parallelopiped and having a closure at its top, a bread loaf support fitting inside the box and consisting of a single sheet of corrugated fiber board scored and bent to provide a horizontal tray which extends for substantially the entire length and width of the box on the inside and which is free of obstructions except for an integral upright divider extending centrally, said divider having a length equal to the length of the tray and a height such that it reaches substantially to the top of the box, the tray being supported by two legs integral therewith and extending for the length of the tray, said legs being formed by bending down edge portions of the sheet which forms the tray, said legs having such a height that the horizontal tray divides the box into two substantially equal parts, a third leg being integral with the tray and extending for the entire length of the tray and having the same height as the other two legs, the third leg also extending centrally and being substantially directly below the upright divider.

2. The invention defined in claim 1 wherein both the upright divider and the third leg are of double thickness, and means are provided to secure the double thicknesses together.

EUGENE F. LILLIE.

REFERENCES CITED

The following references are of record in the file of this patent:

UNITED STATES PATENTS

| Number | Name | Date |
|---|---|---|
| 979,373 | Brasseur | Dec. 20, 1910 |
| 1,092,682 | Weber | Apr. 7, 1914 |
| 1,170,729 | Beckstrom | Feb. 8, 1916 |
| 2,105,645 | Gemmill | Jan. 18, 1938 |

FOREIGN PATENTS

| Number | Country | Date |
|---|---|---|
| 303,241 | Great Britain | Jan. 3, 1929 |